June 15, 1926.
B. SCHERER
1,588,623
AUTOMOBILE ELECTRIC LIGHTING SYSTEM
Filed Dec. 9, 1924
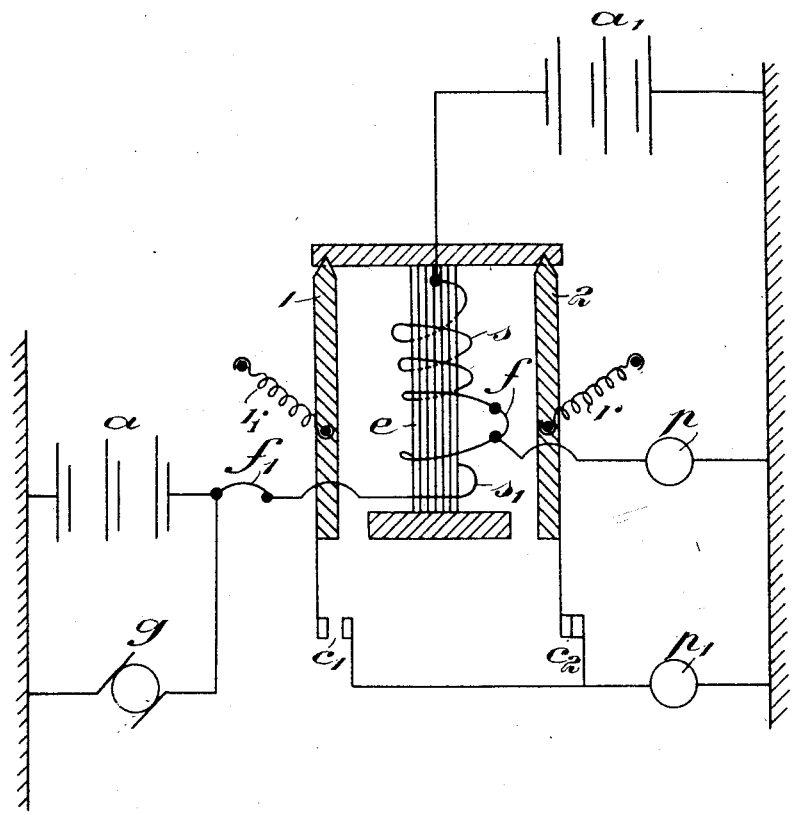

Patented June 15, 1926.

1,588,623

UNITED STATES PATENT OFFICE.

BENOIT SCHERER, OF COURBEVOIE, FRANCE.

AUTOMOBILE ELECTRIC-LIGHTING SYSTEM.

Application filed December 9, 1924. Serial No. 754,874.

This invention consists in an improved arrangement of electromagnetic or contactor relay in automobile lighting installations for the purpose of automatically closing an auxiliary lighting circuit in the case of a breakdown in the main lighting circuit, and at the same time for completely protecting the installation.

According to this invention the relay comprises two armatures under the action of unequal springs, these armatures being adapted when attracted under the action of unequal differential windings common to both of them to close and open respectively two circuits both allowing when closed an auxiliary lighting circuit to be brought into use in case of disturbance of the main circuit.

By way of example one embodiment of the invention is diagrammatically shown in the single figure of the accompanying drawing.

In the drawing $a$ is a battery supplying a main lighting circuit $p$.

$a_1$ is a battery of smaller capacity supplying an auxiliary circuit $p_1$.

$f$ is a fuse connecting $a$ and $a_1$.

$f_1$ is a fuse for the circuit $p$.

$g$ is the generator.

$s$ is a winding, having a certain resistance, for permitting the battery $a_1$ to be charged at a lower rate than battery $a$, and connected to the magnet core at the end connected to the battery.

$s_1$ is a winding of very low resistance wound in the opposite direction to $s$ and through which passes the current in the main circuit $p$ (main lighting).

$e$ is the body of the electromagnet forming the core for the windings $s$ and $s_1$.

$c_1$ and $c_2$ are pairs of contacts, each pair forming an interrupter for the circuit $p_1$ (auxiliary lighting).

$r$ and $r_1$ are springs of unequal strength opposing the attraction of armatures or blades 1 and 2 by the electromagnet $e$, $r_1$ being the stronger spring.

The relay operates in the following manner:

The generator $g$ charges in parallel, battery $a$ and battery $a_1$, the latter being in series with the winding $s$ having a certain resistance.

Normally, when the circuit $p$ is in operation, a certain current passes through the winding $s_1$. This current is the sum of the current in the circuit $p$ and the charging current of the battery $a_1$. The latter current also passes through the winding $s$ which, consisting of a larger number of turns than $s_1$, has a preponderating effect and causes the attraction of the armature 2 and in consequence the opening of the contact $c_2$, thereby maintaining the auxiliary lighting circuit out of operation.

The action in the event of fault is set out below.

(1) *Permanent excess voltage, causing destruction of the lamps or other translating devices in the circuit $p$.*—The preponderating effect of the increased current in the winding $s$ rises considerably and causes the attraction of armature 1. The contact $c_1$ is thus closed and the auxiliary lighting or other circuit $p_1$ brought into service. If the excess current causes either of the fuses $f$ or $f_1$ to melt, the armatures 1 and 2 will cease to be attracted and the circuit $p_1$ is thus fed by the battery $a_1$ through the contact $c_2$ which will be closed (as shown in the figure).

(2) *Short circuit of the main lighting circuit between $f$ and $p$.*—Owing to the short circuit practically no current passes through the circuit $p$ and lamps therein therefore do not light up.

Until the fuse $f_1$ melts, the armature 1 is attracted and closes the auxiliary circuit $p_1$ through contact $c_1$. The current in winding $s$ will have augmented and acts in the same sense in the winding $s_1$. When the fuse $f_1$ melts both armatures are attracted and the auxiliary circuit $p_1$ is supplied from the battery $a_1$ through contacts $c_1$. If the fuse $f$ melts in turn, the armature 2 is released and the auxiliary lighting circuit closed also through the contact $c_2$.

(3) *Rapid discharge of the main battery through short circuit in its interior or across its terminals.*—The battery $a_1$ tends to recharge the battery $a$ through the windings $s$ and $s_1$. These windings are proportioned so that when the current from battery $a$ is insufficient to light the main circuit $p$ the current from battery $a_1$ towards battery $a$ becomes sufficient to cause the armature 1 to be attracted, thus closing contact $c_1$ and bringing the auxiliary circuit $p_1$ into service. The voltage of $a$ continuing to fall, fuse $f$ melts and prevents the discharge of battery $a_1$ into battery $a$. At this moment the armature 1 is released and the contact $c_1$ opened. But since the current in the winding $s_1$ from $a$ has become very weak, the armature 2 is also liberated and the circuit of the auxiliary circuit $p_1$ is thus closed through the contact $c_2$.

(4) *Extinction of the main lamps through wear, shocks, etc.*—The winding $s_1$ being traversed by a reduced current the action of the coil $s$ increases and the armature 1 is attracted, thus closing the circuit $p_1$ through the contact $c_1$.

Having thus described my invention, I claim:

1. An automobile electric lighting system including an electro-magnetic core, a main circuit including coils on said core, an auxiliary circuit also including coils on said core, the last named coils being connected to and of greater resistance than and wound in the reverse direction to the first named coils, a contact for each circuit and an armature for each circuit, each armature having a contact for coaction with one of the first named contacts, each pair of contacts forming an interrupter for said auxiliary circuit and a spring for each armature, one of said springs being stronger than the other, the winding of greater resistance exerting a preponderating force even when the current traversing the same is weaker than that which traverses the other winding so that the auxiliary circuit is normally open and is closed by the armature subjected to the action of the weaker spring.

2. An automobile electric lighting system including an electro-magnetic core, a main circuit including coils on said core, an auxiliary circuit also including coils on said core, the last named coils being of greater resistance than and wound in the reverse direction to the first named coils, a fuse connecting said circuits, a fuse in the main circuit, a battery in each circuit, a generator to charge said batteries, a contact for each circuit and an armature for each circuit, each armature having a contact for coaction with one of the first named contacts, each pair of contacts forming an interrupter for said auxiliary circuit, and a spring for each armature, one of said springs being stronger than the other, the winding of greater resistance exerting a preponderating force even when the current traversing the same is weaker than that which traverses the other winding so that the auxiliary circuit is normally open and is closed by the armature subjected to the action of the weaker spring.

3. An automobile electric lighting system including an electro-magnetic core, a main circuit including coils on said core, an auxiliary circuit also including coils on said core, the last named coils being of greater resistance than and wound in the reverse direction to the first named coils, a fuse connecting said circuits, a fuse in the main circuit, a battery in each circuit, a generator to charge said batteries and to which the latter are connected in parallel by said circuits, a contact for each circuit and an armature for each circuit, each armature having a contact for coaction with one of the first named contacts, each pair of contacts forming an interrupter for said auxiliary circuit, and a spring for each armature, one of said springs being stronger than the other, the winding of greater resistance exerting a preponderating force even when the current traversing the same is weaker than that which traverses the other winding so that the auxiliary circuit is normally open and is closed by the armature subjected to the action of the weaker spring.

In witness whereof I affix my signature.

BENOIT SCHERER.